(12) United States Patent
Archambaud et al.

(10) Patent No.: US 6,198,784 B1
(45) Date of Patent: **\*Mar. 6, 2001**

(54) METHODS OF SYNCHRONIZING A PERSONAL HANDY-PHONE SYSTEM STATION AND PHASE LOCK LOOPS

(75) Inventors: Denis Archambaud, Antibes; Patrick Feyfant, Toulon; Philippe Gaglione, Mandelieu; Varenka Martin, Antibes; Oliver Weigelt, Antibes; Laurent Winckel, Antibes; Satoshi Yoshida, Nice, all of (FR)

(73) Assignee: VLSI Technology, Inc., Sunnyvale, CA (US)

( \* ) Notice: Subject to any disclaimer, the term of this patent is extended or adjusted under 35 U.S.C. 154(b) by 0 days.

This patent is subject to a terminal disclaimer.

(21) Appl. No.: 09/422,029

(22) Filed: Oct. 20, 1999

Related U.S. Application Data

(63) Continuation of application No. 08/906,531, filed on Aug. 5, 1997, now Pat. No. 6,016,331.

(51) Int. Cl.$^7$ .......................... H04L 25/36; H04L 25/40; H04L 7/00
(52) U.S. Cl. .......................... 375/371; 375/365; 370/516
(58) Field of Search .................... 375/371, 356, 375/354, 362, 365, 376, 373, 377; 370/350, 324, 514, 516; 327/141, 147, 151; 329/307, 308; 332/127

(56) References Cited

U.S. PATENT DOCUMENTS

| | | |
|---|---|---|
| 4,025,720 | 5/1977 | Pachynski, Jr. . |
| 4,929,849 | 5/1990 | Paul ...................................... 307/269 |
| 5,168,245 | 12/1992 | Koskowich ................................ 331/1 |
| 5,325,075 | 6/1994 | Rapeli .................................... 332/11 |
| 5,434,905 | 7/1995 | Maeda et al. .......................... 379/61 |
| 5,533,072 | 7/1996 | Georgiou et al. ..................... 375/371 |
| 5,555,258 | 9/1996 | Snelling et al. ........................ 370/29 |
| 5,581,214 | 12/1996 | Iga ......................................... 331/16 |
| 5,586,122 | 12/1996 | Suzuki et al. ......................... 370/347 |
| 5,598,419 | 1/1997 | Weigand et al. ...................... 370/514 |
| 5,603,847 | 2/1997 | Takahashi ............................. 370/280 |

(List continued on next page.)

FOREIGN PATENT DOCUMENTS 8-046565  2/1996  (JP) .

OTHER PUBLICATIONS

*Cordless in the Local Loop* by Margareta Zanichelli, from *Cordless Telecommunications Worldwide*, Walter H. W. Tuttlebee, pp. 71–87.

*The PHS Standard*, by Yuichiro Takagawa, from *Cordless Telecommunications Worldwide*, Walter H. W. Tuttlebee, pp. 429–438.

*Personal Handy–Phone System (PHS) Guidebook*, Ministry of Posts & Telecommunications, Japan.

PHS RCR STD–28, Chapter 1, General.

*Primary Examiner*—Chi H. Pham
*Assistant Examiner*—Jean B. Corrielus
(74) *Attorney, Agent, or Firm*—Wells, St. John, Roberts, Gregory & Matkin, P.S.

(57) ABSTRACT

The present invention provides methods of synchronization, personal handy-phone system stations, and phase lock loops. Synchronization of a personal handy-phone system station with a telecommunication network, and another communication station are provided. One method of synchronization comprises: providing a counter configured to generate a plurality of counter values; storing a first counter value; detecting a reference event; latching a second counter value responsive to the detecting of the reference event; comparing the first counter value and the second counter value to detect phase drift; and compensating for phase drift responsive to the comparing.

21 Claims, 4 Drawing Sheets

U.S. PATENT DOCUMENTS

| | | | |
|---|---|---|---|
| 5,636,243 | 6/1997 | Tanaka | 375/219 |
| 5,668,813 | 9/1997 | Malek et al. | 370/514 |
| 5,692,023 | 11/1997 | Clark | 375/376 |
| 5,742,208 * | 4/1998 | Blazo | 331/23 |
| 5,777,499 | 7/1998 | Takaishi | 327/159 |
| 5,790,942 | 8/1998 | Le Core et al. | 455/112 |
| 5,818,304 | 10/1998 | Hogeboom | 331/11 |
| 5,982,831 * | 11/1999 | Chu | 375/371 |

* cited by examiner

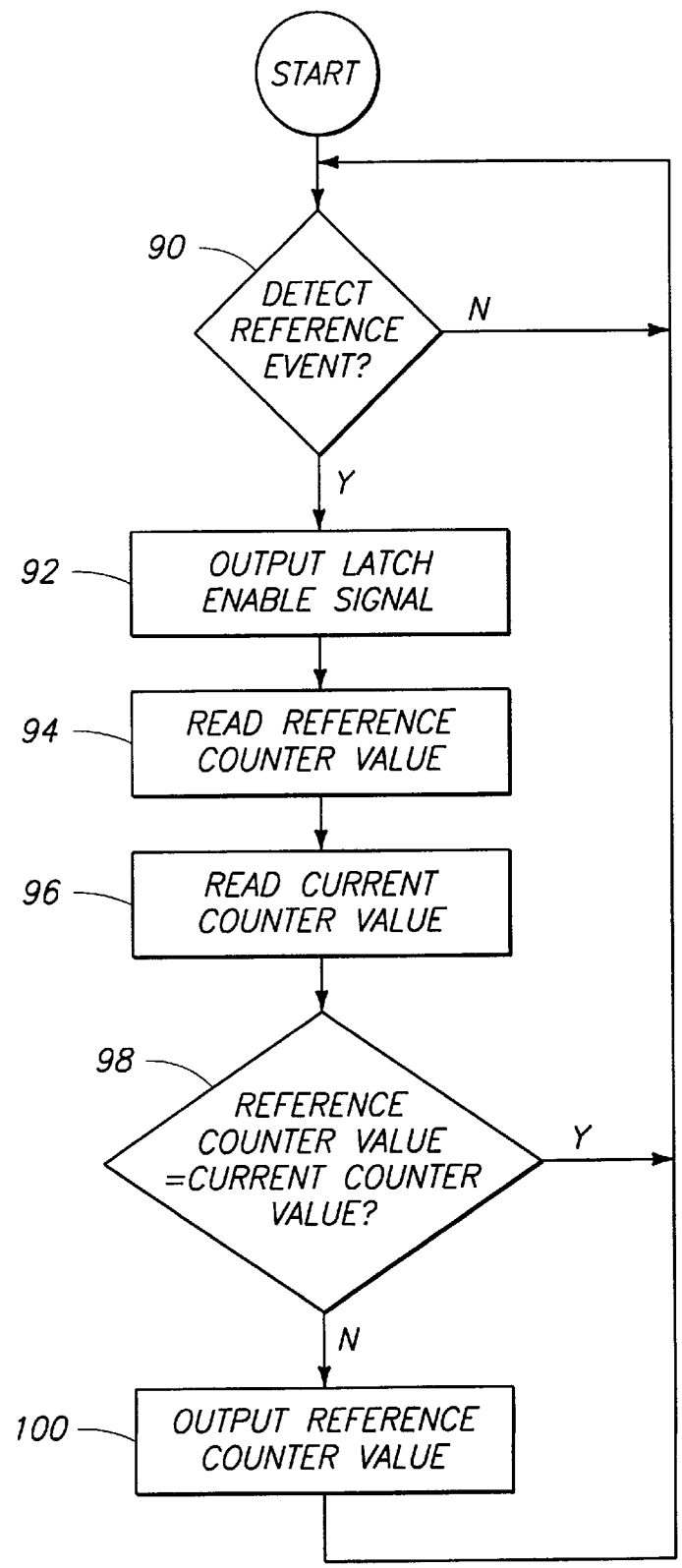

METHODS OF SYNCHRONIZING A PERSONAL HANDY-PHONE SYSTEM STATION AND PHASE LOCK LOOPS

RELATED PATENT DATA

This patent resulted from a continuation application of U.S. patent application Ser. No. 08/906,531, filed Aug. 5, 1997, now U.S. Pat. No. 6,016,331 entitled "Methods of Synchronization, Personal Handy-Phone System Stations and Phase Lock Loops", naming Denis Archambaud et al. as inventors, the disclosure of which is incorporated by reference.

TECHNICAL FIELD

The present invention relates to methods of synchronization, personal handy-phone system stations and phase lock loops.

BACKGROUND OF THE INVENTION

The benefits of a wireless communication network are readily recognized. The ability to transmit and receive either voice or peripheral (i.e., facsimile) messages in mobile applications has been utilized in numerous applications.

Wireless communications systems include cellular systems which have particularly enjoyed expansive popularity. Cellular systems generally comprise a base station and a plurality of portable stations. Cellular systems offer a radius of approximately 1–15 km per base station, and traditionally provide coverage for cities, railways and main roads. However, existing cellular systems typically utilize a service network which is distinct from the existing network (e.g., Public Switched Telephone Network (PSTN) or Integrated Services Digital Network (ISDN)).

Other wireless communication protocols have been introduced to provide benefits over existing cellular wireless technologies. Such communication protocols provide benefits of interfacing directly with and utilizing the existing digital network. Such direct interfacing capabilities eliminate the need for a distinct switching system.

One such communication system is the personal handy-phone system (PHS). The personal handy-phone system is a digital cordless telephone system that offers integrated telecommunication services, such as voice and data, via a universal radio interface. The personal handy-phone system offers digitalization of the communication system. In particular, the digital personal handy-phone system offers improved quality and effective use of frequencies.

Personal handy-phone systems comprise at least one base station and a plurality of corresponding personal stations. The personal handy-phone system offers flexible inter-connectability wherein connection of a personal station with a plurality base stations at various locations such as the office, home, or outdoors is possible. The PHS standard is set forth by the Telecommunications Technical Committee of Japan in "Personal Handy Phone System", Japanese Telecommunications System Standard, RCR-STD 28.

The personal handy-phone system also offers connectability with existing communications networks. Connection is possible with analog telephone networks as well as digital networks.

Personal handy-phone systems typically comprise a plurality of personal stations (PS), also referred to as handsets, and base stations, also referred to as cell stations (CS). Personal handy-phone systems are designed to provide wireless multimedia communications, terminal mobility, and complete two way communications. Personal handy-phone systems utilize a micro-cell structure. Personal stations and base stations of the personal handy-phone system are configured to transmit and receive data via a plurality of data packets, also referred to as slots.

The base stations may be of a low power output type (i.e., 10 mW) generally for indoor applications, or a standard power output type (i.e., 20 mW) or high power output type (i.e., 100–500 mW) for outdoor applications. Group control functions may be implemented to increase communication channels in an area with heavy traffic whereby multiple base stations are controlled via the same control channel. Such stations may be arranged in a master/slave configuration.

Radio interfaces of the base stations and personal stations individually have four-channel time division multiple access capability with time division duplexing (four-channel TDMA-TDD). The implementation of TDMA and TDD in accordance with the personal handy-phone system communication standard necessitates synchronization of the personal stations and the corresponding base station.

Individual base stations are synchronized with the appropriate telecommunications network to ensure reliable communications therebetween. Individual ones of the slave base stations are synchronized with the master base station in master/slave configurations.

Reference signals provided by conventional telecommunication networks (e.g., Integrated Services Digital Network) are typically unreliable inasmuch as phase drift is frequently experienced in such reference signals. Further, other reference signals may also experience phase drift during communications between the devices. It is preferred to periodically analyze the synchronization of the communication devices to verify the correct timing of the devices and compensate for phase drift.

Conventional synchronization techniques utilize hard-wired circuitry to compensate for phase drift and assure synchronization. However, these techniques are designed for a specific use and fail to provide flexibility to support a plurality of applications.

Therefore, there exists a need for assuring synchronization of the communication stations of a personal handy-phone system and providing flexibility for assuring synchronization in a plurality of applications.

BRIEF DESCRIPTION OF THE DRAWINGS

Preferred embodiments of the invention are described below with reference to the following accompanying drawings.

FIG. 7 illustrates a flow diagram of a control process for analyzing reference events for implementing synchroniza-}

SUMMARY OF THE INVENTION

Figure 1:
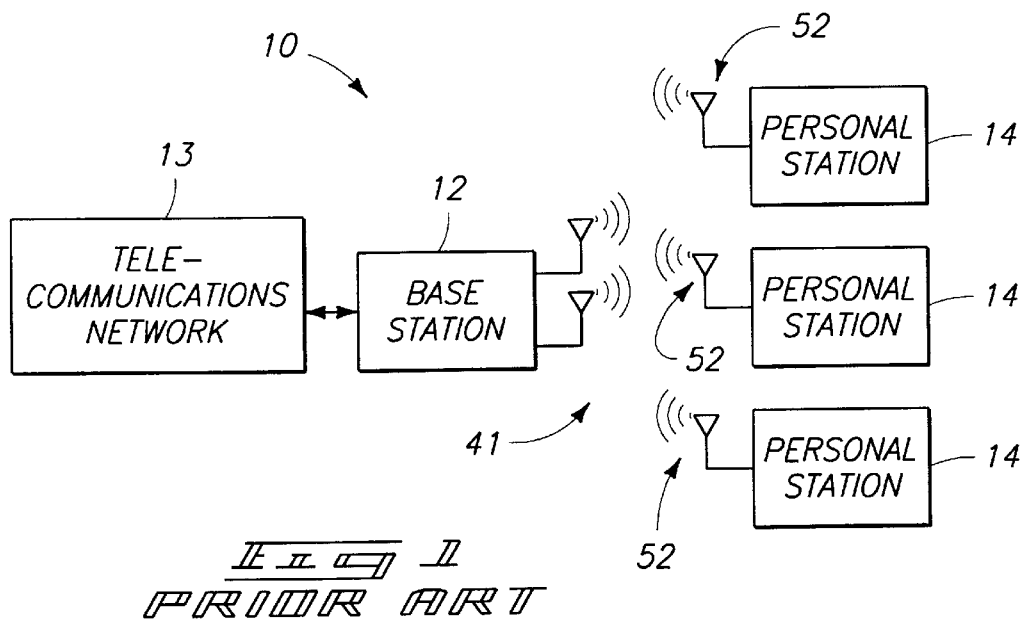
FIG. 1 is a block diagram of a personal handy-phone system comprising a base station and a plurality of personal stations in radio communication with the base station.

The disclosure provides a phase lock loop and methods for implementing synchronization functions. A plurality of personal handy-phone system frames are synchronized to one of a plurality of reference signals. As is discussed in detail below, the particular reference signal utilized for synchronization is selected by software via a processor. Further, the processor is configured to monitor and compensate for any phase drift detected within the reference signal.

According to a first aspect of the present invention, a method of synchronization comprises: providing a counter configured to generate a plurality of counter values; storing a first counter value; detecting a reference event; latching a second counter value responsive to the detecting of the reference event; comparing the first counter value and second counter value to detect phase drift; and compensating for phase drift responsive to the comparing.

In accordance with a second aspect of the present invention, a method of synchronizing a personal handy-phone system station comprises: receiving a reference signal; generating a bit rate signal within the personal handy-phone system station; detecting a plurality of reference events within the reference signal; and adjusting the bit rate signal responsive to the detecting of the reference events.

Another aspect of the present invention provides a method of synchronizing a personal handy-phone system station comprising: receiving a reference signal having a plurality of reference events; generating a plurality of counter values; first detecting an initial reference event; following the first detecting, storing a first counter value; second detecting a subsequent reference event; following the second detecting, storing a second counter value; comparing the first counter value and the second counter value; third detecting phase drift within the reference signal responsive to the comparing of the first counter value and the second counter value; and compensating for phase drift responsive to the third detecting.

An additional aspect of the present invention provides a personal handy-phone system station comprising: an input configured to receive a reference signal; a clock generator comprising: an oscillator configured to generate a timing signal; a counter configured to generate a sequence of counter values responsive to the timing signal; and an output latch configured to selectively store a plurality of counter values; and a processor coupled with the clock generator, the processor being configured to compare the counter values and compensate for phase drift within the reference signal.

Yet another aspect of the present invention provides a phase lock loop comprising: an input operable to receive a reference signal; a clock generator configured to generate a bit rate signal; and a processor coupled with the input and the clock generator, the processor being configured to detect phase drift within the reference signal and compensate for phase drift in the bit rate signal.

DETAILED DESCRIPTION OF THE PREFERRED EMBODIMENTS

Referring to FIG. 1, a personal handy-phone system (PHS) 10 is shown. The illustrated personal handy-phone system 10 comprises a base station 12 and a plurality of personal stations 14. Base station 12 is typically coupled with a telecommunication network 13, such as an ISDN or PSTN. A given cell may contain plural base stations 12 depending upon the traffic volume to be handled. In an exemplary embodiment, a master base station and plurality of slave base stations are provided for such increased transmission capabilities. FIG. 1 shows but one of such base stations.

The personal handy-phone system is configured to allow movement of the personal stations 14 throughout a cell during communication with a respective base station 12. Base stations 12 are configured to handover communications with a corresponding personal station 14 to an adjacent base station 12 responsive to the movement of the personal station 14. Personal stations 14 are also configured provide mobile radio communications directly to other personal stations 14.

Base station 12 includes a first antenna configuration 42 comprising dual antennas for providing antenna diversity. Antenna diversity provides improved spectral efficiency. Base station 12 is configured to receive communications from personal stations 14 via one of the antennas of configuration 42, which provides the best signal. Personal stations 14 include respective antenna configurations 52 for providing radio frequency communications.

The personal handy-phone system communication protocol (i.e., four-channel TDMA-TDD) provides one control channel and three traffic channels for an individual base station 12. Providing time division multiple access capability with time division duplexing avoids the need for paired frequency bands.

Figure 2:
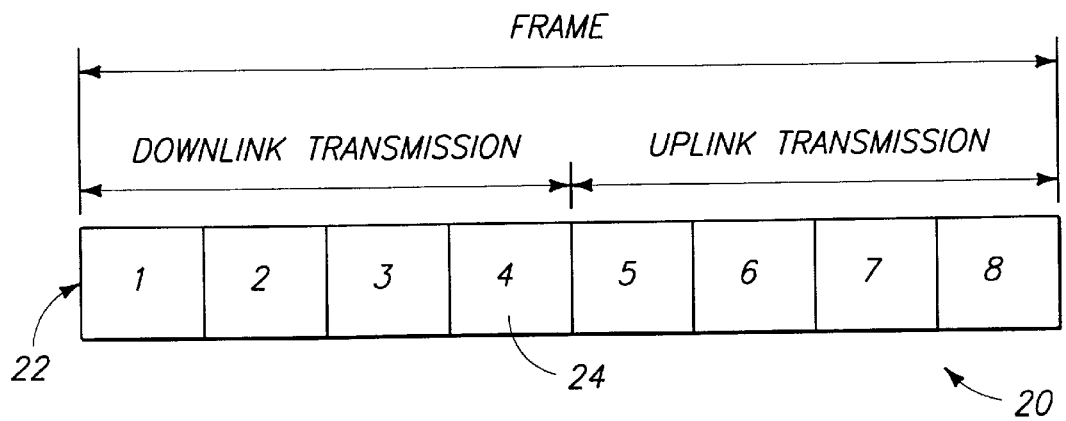
FIG. 2 is an illustrative view of a frame structure according to the personal handy-phone system communication protocol.

Referring to FIG. 2, a typical radio channel structure 20 is shown. The radio channel structure comprises a frame 22 which comprises a plurality of slots 24 (eight slots are shown defining one frame in FIG. 2). In particular, one five millisecond TDMA-TDD frame within the radio channel structure 20 includes four slots for base station transmission, and four slots for personal station transmission. Communications from base station 12 to respective personal stations 14, referred to herein as downlink communications, occur within the first four slots 24 of the frame 22 (i.e., slots 1–4). Communications from respective personal stations 14 to the base station 12, referred to herein as uplink communications, occur within the subsequent four slots of the illustrated frame 22 (i.e., slots 5–8).

The personal handy-phone system communications protocol provides for a control channel (CCH) and a communication channel, also referred to as a traffic channel (TCH). The control channel (CCH) may be one of a variety of formats in accordance with the personal handy-phone system standard. The control channel is composed of a combination of a common control channel (CCCH) and an associated control channel (ACCH). The common control channel and associated control channel make up a single dedicated channel providing improved performance in conditions of intermittent communications. The traffic channel is utilized to transmit user traffic information.

Figures 3, 4:
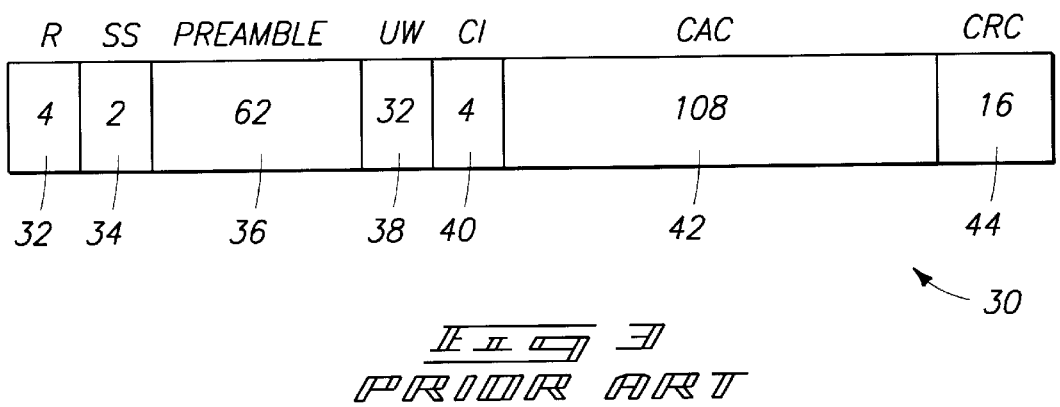
FIG. 3 is an illustrative view of the structure of a control slot according to the personal handy-phone system communication protocol.
FIG. 4 is a block diagram of one embodiment of a base station.

Referring to FIG. 3, a typical control slot 30 is shown. Control slot 30 comprises 224 bits, thus allowing sixteen guard bits intermediate adjacent slots. A ramp field (R) 32 of control slot 30 comprises four ramp bits and a start symbol field (SS) 34 comprises two start symbol bits. A preamble 36 follows the start symbol field 34 and comprises sixty-two bits.

Control slot 30 additionally comprises a unique word (UW) 38 of thirty-two bits which follows the preamble 36. The unique word 38 is a predetermined pattern which establishes transmit and receive timing. A channel identifier field (CI) 40 of four bits is next provided after the unique word 38. A common access channel field (CAC) 42 and a cyclic redundancy check field (CRC) 44 respectively follow the channel identifier field 40.

Common access channel field 42 may comprise one of a plurality of channels. For example, field 42 is selectively a broadcast channel (BCCH), paging channel (PCH) or signalling control channel (SCCH) as defined within the PHS standard.

The broadcast channel is a one-way downlink channel to report control information from the base station 12 to the personal station 14 with which it is communicating. It is utilized to transmit information related to channel structure and system information. The paging channel is a one-way downlink, point-to-multipoint channel that simultaneously transmits identical information to individual cells or a wide area of multiple cells (the paging area) from a base station 12 to the personal station 14. The signalling control channel is a bi-directional, point-to-multipoint channel that transmits information needed for call connection between the base station 12 and the personal station 14. The signalling control channel transmits independent information to each cell. The uplink channels are random access.

Synchronization of the communications system is a concern for ensuring reliable transmission of data, especially in conjunction with the use of TDMA and TDD. In accordance with aspects of the present invention, specified reference events are utilized for ensuring synchronization of base stations 12 and personal stations 14 within the personal handy-phone system 10. Further, synchronization of base station 12 and telecommunication network 13 ensures reliable communication therebetween.

According to one preferred method of the present invention, various reference events specified by software are utilized to assure synchronization. Referring again to FIG. 1, a first reference event is used for synchronization between the telecommunication network 13 and the base station 12. A reference signal provided by telecommunication network 13 is applied to base station 12 for assuring synchronization.

Base station 12 is configured to transmit a second reference event which is received within corresponding personal stations 14. Personal stations 14 are configured to synchronize to the second reference event generated by the appropriate base station 12.

In master/slave base station PHS system configurations, the slave base stations are synchronized with the timing of the master base station. In particular, the master base station generates a third reference event for providing synchronization to corresponding slave base stations.

Figure 5:
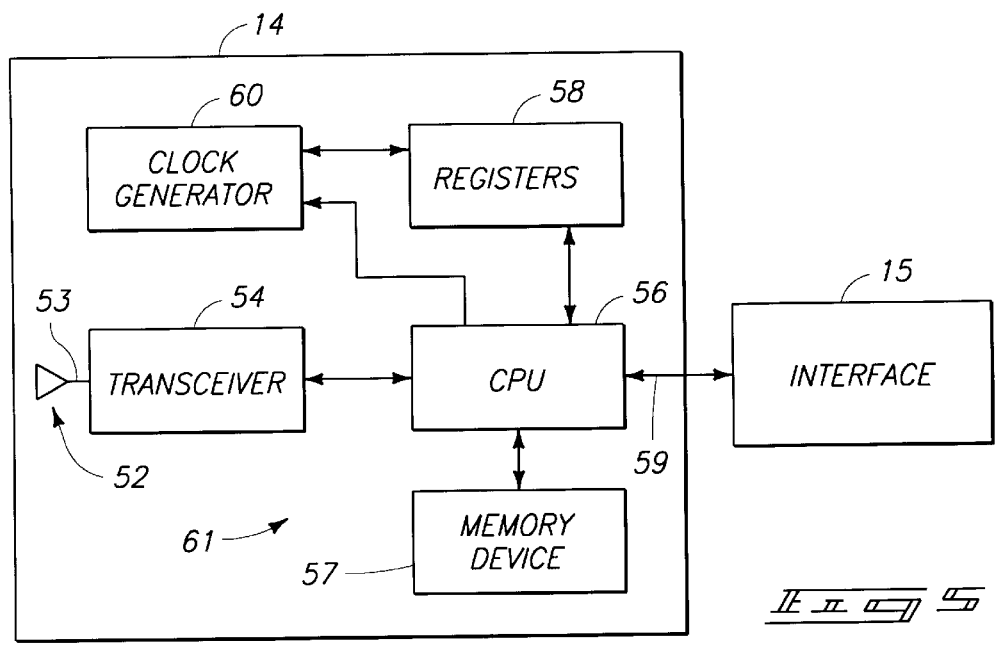
FIG. 5 is a block diagram of one embodiment of a personal station.

Referring to FIG. 4 and FIG. 5, respective embodiments of base station 12 and one of personal stations 14 are shown. The illustrated base station 12 and personal station 14 respectively comprise clock generators 50, 60, antenna configurations 41, 52, transceivers 45, 54, central processing units (CPUs) 46, 56, memory devices 47, 57 and registers 48, 58.

Transceiver 45 includes an input and output coupled with antenna configuration 41 via connection 43. Central processing unit 46 includes an input and output coupled with telecommunication network 13. Transceiver 54 includes an input and output coupled with antenna configuration 52 via connection 53. Central processing unit 56 includes an input and output coupled with interface 15. The inputs are operable to receive a reference signal.

Base stations 12 and personal stations 14 individually include respective phase lock loops 51, 61 for verifying integrity of the reference signal and providing synchronization of the communication devices within the personal handy-phone system. Phase lock loops 51, 61 detect and compensate for phase drift within the particular reference signal being utilized for synchronization.

In the illustrated embodiment, phase lock loops 51, 61 respectively comprise at least one selected input, one of clock generators 50, 60, and one of central processing units 46, 56. Central processing units 46, 56 are also referred to as processors.

Antenna configurations 41, 52 are utilized to implement two-way communication of radio frequency signals. Antenna configurations 41, 52 are coupled with appropriate switching circuitry for providing both transmission and reception operations.

Transceivers 45, 54 contain appropriate transmission circuitry for providing modulation of the appropriate carrier frequency signal by the baseband signal, and demodulation circuitry for recovering the baseband signal from the received radio frequency signals.

Central processing units 46, 56 provide control information to respective transceivers 45, 54 for controlling the transmission operations. Further, central processing units 46, 56 monitor control information from transceivers 45, 54 during receive modes of operation.

Central processing units 46, 56 are configured via operational software code to also function as TDMA processors to perform manipulation operations providing the transmission data and control information into slots and frames in accordance with the personal handy-phone system communications protocol. Similarly, central processing units 46, 56 are configured via software code to retrieve the data and control information from the slots within the baseband signals received within transceivers 45, 54.

Central processing units 46, 56 are coupled with respective memory devices 47, 57. Software code for configuring central processing units 46, 56 is stored in respective memory devices 47, 57. In one embodiment, memory devices 47, 57 comprise volatile memory permitting flexibility of storing different operational software code. In an alternative embodiment, memory devices 47, 57 comprise a ROM or other non-volatile memory for storing software code utilized by central processing units 46, 56.

Data information (e.g., voice, peripheral) may be applied to the telecommunication network 13. Certain control information may be applied to registers 48, 58 and clock generators 50, 60. Clock generators 50, 60 are configured to output control information to central processing units 46, 56 via registers 48, 58. Registers 48, 58 are configured to provide bi-directional communications. As discussed in detail below, clock generators 50, 60 are configured to generate a bit-rate signal utilized for timing within respective base station 12 and personal station 14. Clock generators 50, 60 assist with the implementation of digital phase lock loop operations for eliminating drift and providing synchronization.

Central processing unit 46 of base station 12 is coupled with telecommunication network 13 and bi-directional communications are provided therebetween. Base station 12 is operable to apply data received from corresponding personal stations 14 to telecommunication network 13. Further, telecommunication network 13 applies data and control information to base station 12. Such control information may include synchronization information.

Central processing unit 56 of personal station 14 is coupled with interface 15. Interface 15 contains receiving interfaces such as a microphone or a port for receiving voice or facsimile data. Interface 15 also includes interfaces such as a LCD or LED display for conveying received visual information and a speaker for conveying received audio information.

Figure 6:
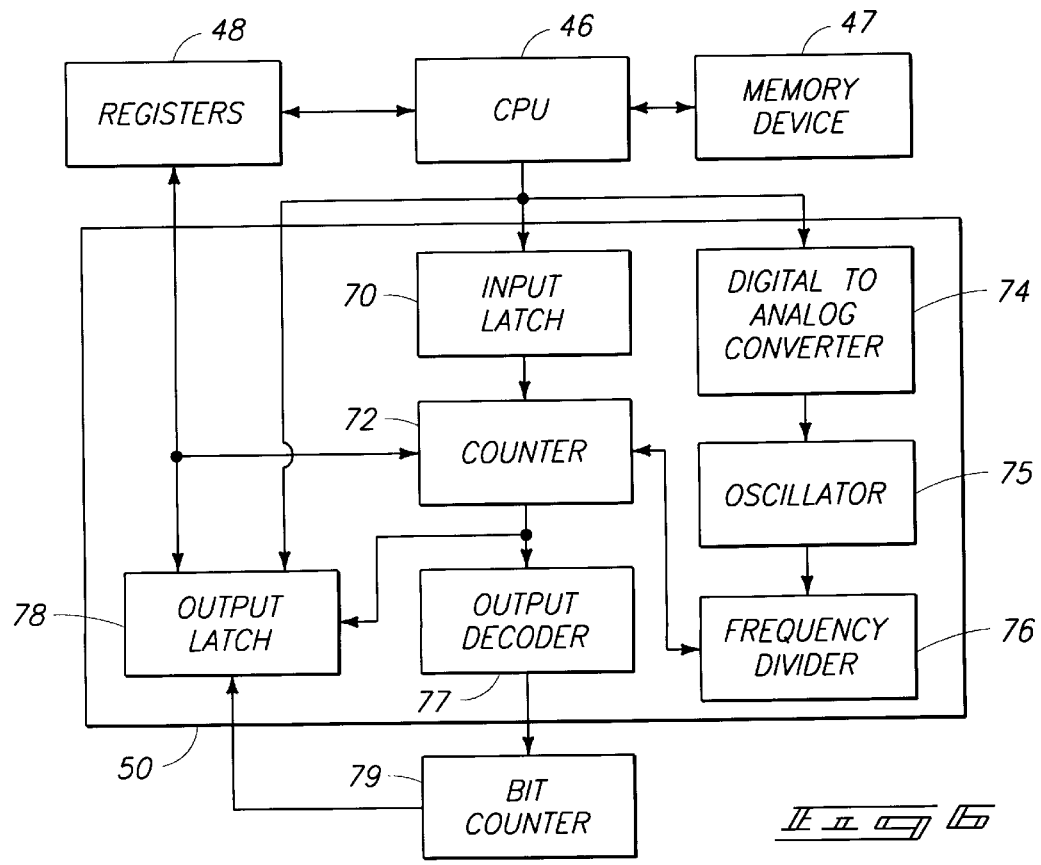
FIG. 6 is a block diagram of an embodiment of the clock generator of the base station shown in FIG. 4.

According to the preferred embodiment, respective clock generators 50, 60 are implemented utilizing the embodiment of the clock generator 50 shown in FIG. 6. In particular, a preferred clock generator may be configured for use in either a base station 12 or personal station 14. Although FIG. 6 is described herein with reference to implementation of clock generator 50 within a base station 12, it is to be understood that the illustrated embodiment of the clock generator 50 may also be implemented as clock generator 60 with in a personal station 14 of the personal handy-phone system.

The illustrated clock generator 50 comprises an input latch 70, counter 72, digital to analog converter 74, oscillator 75, frequency divider 76, output decoder 77 and output latch 78. The clock generators operate to generate timing signals regardless of whether implemented within a base station 12 or personal station 14.

Oscillator 75 is configured to generate a 19.2 MHz clock timing signal in compliance with the personal-handy phone system standard. The 19.2 MHz timing signal is utilized as a timing reference within respective ones of the communication stations 12, 14. Oscillator 75 is implemented as a voltage-controlled oscillator in accordance with one aspect of the present invention.

The output 19.2 MHz timing signal is applied to frequency divider 76. Frequency divider 76 operates as a divide by 2 divider for providing a 9.6 MHz systems clock signal in accordance with the personal handy-phone system standard. The 9.6 MHz systems clock signal is applied to counter 72.

Counter 72 and output decoder 77 operate to further divide the frequency of the systems clock signal. In particular, a preferred embodiment of counter 72 is configured to sequentially count a plurality of counter values from 0 to 24. Output decoder 77 is configured to generate and output a logic low signal responsive to the counter values of counter 72 being 0–12. Output decoder 77 is configured to generate and output a logic high signal responsive to the counter values of counter 72 being 13–24. Thus, counter 72 and output decoder 77 operate as a divide by 25 frequency divider. More specifically, output decoder 77 outputs a 384 kHz signal responsive to the systems clock signal being a 9.6 MHz signal. The 384 kHz signal is utilized as a bit rate signal in accordance with the personal handy-phone system standard. The 384 kHz signal is applied to bit counter 79 for use within the respective communication station 12, 14. In one embodiment, bit counter 79 is operable to sequentially count from 0 to 239 corresponding to the 240 bit frames specified by the personal handy-phone system communication standard.

Clock generators 50, 60 operate to output the clock signals (e.g., timing signals, bit-rate signals) for utilization within base station 12 and personal station 14, respectively. Base station 12 and personal station 14 are configured for synchronization with a reference signal. In particular, central processing units 46, 56 operate in conjunction with a respective clock generator 50, 60 to provide synchronization of the clock signals with the reference signal.

Still referring to FIG. 6, synchronization operations are discussed below. Central processing units 46, 56 of communication stations 12, 14 are configured to detect a plurality of reference events for synchronization purposes. In the described embodiments, central processing units 46, 56 receive the reference signal from telecommunication network 13, base station 12, or a master base station 12 in a master/slave base station configuration. Central processing units 46, 56 are configured via software code to detect reference events within one of a plurality of reference signals, some of which are described in detail below.

Synchronization operations are discussed with reference to clock generator 50 of base station 12. It is to be understood that clock generator 60 of personal station 14 operates in a similar manner as that of clock generator 50 in one embodiment of the present invention.

Following the detection of reference events within a reference signal by central processing unit 46, corresponding counter values of counter 72 are compared for detecting drift within the reference signal. More specifically, central processing unit 46 outputs a latch enable signal to output latch 78 responsive to the detection of an initial reference event. Output latch 78 is configured to latch the current counter value of counter 72. The latched counter value is available to registers 48 coupled with central processing unit 46. The counter value is stored within registers 48 for future comparison. This counter value is referred to as the reference counter value.

Thereafter, following the detection of a subsequent reference event, output latch 78 latches another counter value from counter 72 responsive to receiving a subsequent latch enable signal from central processing unit 46. This current counter value is applied to registers 48. Central processing unit 46 is operable to read and compare the current counter value with the previously-stored (i.e., reference) counter value. Variance between the reference counter value and the current counter value indicates the presence of drift within the reference signal.

In an alternative embodiment, output latch 72 is configured to receive the reference signal and detect the presence of a reference event therein. Responsive to the detection of a reference event, output latch 78 latches the current counter value of the counter 72. According to further aspects of the present invention, output latch 78 is additionally configured to store bit values from bit counter 79. Responsive to the detection of a reference event, output latch 78 latches the current bit value from counter 79 in addition to latching the current counter value from counter 72.

According to one aspect of the present invention, clock generator 50 is configured to compensate for phase drift through the manipulation of the counter value generated by counter 72. Central processing unit 46 is operable to load the previously-stored reference counter value, or another counter value, into counter 72 via input latch 70 responsive to the detection of phase drift. Central processing unit 46 outputs a control signal to input latch 70 responsive to the presence of drift. Loading of the reference counter value into counter 72 resets the counter and compensates for phase drift within the reference signal. Such loading and resetting aligns the counter 72 with the reference events of the received reference signal.

According to another aspect of the present invention, oscillator 75 comprises a voltage-controlled oscillator. Responsive to the detection of phase drift, central processing unit 46 is operable to output digital control signals to digital to analog converter 74. Analog control signals, corresponding to digital control signals provided by central processing unit 46, are applied to oscillator 75. Such control signals operate to vary the 19.2 MHz timing signal generated by oscillator 75. In particular, adjustment of the voltage via the control signals is utilized to compensate for phase drift within the reference signal. The adjusted output timing signal is applied to frequency divider 76, counter 72, and output decoder 77 to provide for the generation of the respective system clock signal and the bit rate signal.

Referring to FIG. 7, the above mentioned software for providing the comparison of the counter values to detect phase drift and the compensation thereof is described with reference to a flow chart. It is preferred to implement such control process by software to increase flexibility of the selection of reference signals and reference events utilized to provide synchronization and implementation of the digital phase lock loop operations. The flow chart describes a process that is implemented by digital circuitry in an alternative embodiment.

Although FIG. 7 is described with reference to central processing unit 46 of base station 12, it is to be understood that central processing unit 56 of personal station 14 is configured to execute similar software code in accordance with embodiments of the present invention.

First, in step 90, central processing unit 46 monitors for the presence of a reference event. If no reference event is detected, central processing unit 46 continues to monitor for the presence of a reference event. Following the detection of a reference event, central processing unit 46 proceeds to step 92 where central processing unit 46 outputs a latch enable control signal. This enable signal is applied to output latch 78 for latching the current counter value. The current bit value may also be latched responsive to this control signal. The central processing unit 46 next proceeds to step 94 where the stored reference counter value is read by the central processing unit 46. Next, central processing unit 46 proceeds to step 96 where the latched current counter value is read by the central processing unit 46.

Central processing unit 46 proceeds to step 98 where the reference counter value is compared with the current counter value. If the reference counter value is equal to the current counter value then central processing unit 46 proceeds to step 90 to monitor for the detection of a subsequent reference event. If the reference counter value is not equal to the current counter value, the central processing unit 46 proceeds to step 100. While performing step 100, central processing unit 46 outputs a counter value to input latch 70 for application to counter 72 for compensating for phase drift. The outputted counter value may be the reference counter value. Thereafter, central processing unit 46 proceeds to step 90 to monitor for the presence of another reference event.

As previously mentioned, a plurality of reference events may be utilized to provide synchronization. In one implementation of the present invention, base station 12 is synchronized with telecommunication network 13 assuring proper transfer of data therebetween. In particular, telecommunication network 13 outputs a frame synchronization signal. According to personal handy-phone system protocol, frames 20 are individually 5 milliseconds. Telecommunication network 13, such as an ISDN network, typically provides a 200 Hz frame synchronization signal which corresponds to the 5 millisecond PHS frame format. In this described implementation, the frame synchronization signal is utilized as the reference signal for synchronizing base station 12. The cycles of the 200 Hz frame synchronization signal correspond to the beginning of a PHS frame and are utilized as reference events in accordance with a first implementation of the invention.

Personal stations 14 are typically synchronized with a corresponding base station 12. As described above, the base stations 12 transmit slots to the personal stations 14 in accordance with the personal handy-phone standard. Such slots include a unique word 38. The unique word 38 is utilized for synchronization of the personal stations 14 to a base station 12 according to one aspect of the present invention. The unique words 38 are utilized as reference events for synchronization. In particular, phase drift may be identified within the reference signal and compensated for in accordance with the previously-described methods through the utilization of unique words 38 as the reference events.

In master/slave base station configurations, the master station is preferably configured to apply a 200 Hz frame synchronization signal to corresponding slave stations. The frame synchronization signal provided by the master base station is utilized as the reference signal having a plurality of reference events (i.e., the individual cycles of the 200 Hz frame synchronization signal).

In an alternate embodiment, a unique word 38 transmitted from the master base station is utilized for synchronization of the slave base stations. In such embodiments, the slave base stations are configured to operate as personal stations during the transmission of the unique word 38 from the master base station. The received unique words 38 are utilized as reference events by the respective slave base stations in this embodiment.

The current value of counter 72 is latched responsive to the reception of the appropriate reference event (e.g., cycle of the frame synchronization signal, unique word). The latched current counter value is compared with the stored current value in accordance with preferred methods of the present invention described above.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A synchronization method comprising:
   receiving a reference signal having a plurality of reference events;
   generating a timing signal independent of the reference signal;
   generating a bit rate signal responsive to the timing signal, the generating comprising:
      utilizing a counter, generating a plurality of counter values responsive to the timing signal; and
      decoding the counter values to establish the bit rate signal;
   detecting the plurality of reference events within the reference signal after the receiving; and
   adjusting the bit rate signal responsive to the detecting of the reference events.

2. The method according to claim 1 wherein the reference events individually comprise a unique word of a personal handy-phone system slot.

3. The method according to claim 1 further comprising utilizing the timing signal as a timing reference within a personal handy-phone system station.

4. The method according to claim 1 wherein the generating of the bit rate signal comprises:
   decoding the counter values to establish the bit rate signal having a frequency different than a frequency of the timing signal.

5. The method according to claim 1 wherein the adjusting comprises resetting a current counter value of the counter.

6. The method according to claim 1 wherein the generating of the timing signal comprises using a voltage controlled oscillator.

7. The method according to claim 6 wherein the adjusting comprises controlling a voltage of a control signal applied to the voltage controlled oscillator.

8. The method according to claim 1 further comprising detecting phase drift responsive to the detecting of the reference events.

9. The method according to claim 8 wherein the adjusting is responsive to the detecting of phase drift.

10. The method according to claim 8 wherein the detecting phase drift comprises:
   storing a first counter value responsive to detecting an initial reference event;
   latching a second counter value responsive to detecting a subsequent reference event; and
   comparing the first counter value and the second counter value.

11. The method according to claim 10 wherein the comparing of the counter values and the adjusting of the bit rate signal comprise using a processor.

12. A phase lock loop comprising:
   an input operable to receive a reference signal having a plurality of reference events;
   a clock generator configured to generate a timing signal independent of the reference signal and to generate a bit rate signal responsive to the timing signal, the clock generator comprising:
      a counter configured to count a plurality of counter values; and
      an output decoder operable to generate the bit rate signal responsive to the counter values; and
   a processor coupled with the input and the clock generator, the processor being configured to detect the reference events, and to detect phase drift within the reference signal responsive to the detection of the reference events and to adjust the bit rate signal to compensate for the phase drift.

13. The phase lock loop according to claim 12 wherein the output decoder is operable to generate the bit rate signal having a frequency different than a counting frequency of the counter.

14. The phase lock loop according to claim 12 wherein the processor is configured to apply a reference counter value to the counter to compensate for phase drift.

15. The phase lock loop according to claim 12 wherein the clock generator further comprises a voltage control oscillator configured to generate the timing signal.

16. The phase lock loop according to claim 15 wherein the processor is configured to adjust a voltage of a control signal applied to the voltage controlled oscillator.

17. The phase lock loop according to claim 15 wherein the processor is configured to compare the plurality of counter values to detect phase drift.

18. The phase lock loop according to claim 12 wherein the reference events individually comprise a unique word of a personal handy-phone system slot.

19. The phase lock loop according to claim 12 wherein the reference signal is generated by a telecommunication network.

20. A synchronization method comprising:
   receiving a reference signal having a plurality of reference events;
   generating a timing signal independent of the reference signal;
   generating a bit rate signal responsive to the timing signal;
   detecting the plurality of reference events within the reference signal after the receiving;
   detecting phase drift responsive to the detecting of the reference events, the detecting phase drift comprising:
      storing a first counter value responsive to detecting an initial reference event;
      latching a second counter value responsive to detecting a subsequent reference event; and
      comparing the first counter value and the second counter value; and
   adjusting the bit rate signal responsive to the detecting of the reference events.

21. The synchronization method according to claim 20 wherein the comparing of the counter values and the adjusting of the bit rate signal comprise using a processor.

* * * * *